United States Patent [19]

Yang

[11] Patent Number: 5,749,393

[45] Date of Patent: May 12, 1998

[54] VALVE SEALING MECHANISM FOR FAUCET

[76] Inventor: Tsai Chen Yang, P.O. Box 63-99, Taichung, Taiwan

[21] Appl. No.: 869,643

[22] Filed: Jun. 5, 1997

[51] Int. Cl.$^6$ .................................................. F16K 5/10
[52] U.S. Cl. ........................ 137/454.2; 251/208; 251/304
[58] Field of Search ............................. 251/208, 205, 251/366, 304; 137/625.41, 625.46, 454.5, 454.2

[56] References Cited

U.S. PATENT DOCUMENTS

| | | | |
|---|---|---|---|
| 4,397,330 | 8/1983 | Hayman | 137/625.41 X |
| 4,425,935 | 1/1984 | Gonzalez | 137/454.2 X |
| 4,966,186 | 10/1990 | Rodstein | 251/304 X |
| 5,094,258 | 3/1992 | Orlandi | 251/208 X |
| 5,107,884 | 4/1992 | Orlandi | 251/304 X |
| 5,355,906 | 10/1994 | Marty et al. | 137/625.41 |
| 5,467,799 | 11/1995 | Buccicone et al. | 251/208 X |

Primary Examiner—Kevin Lee

[57] ABSTRACT

A valve for a faucet includes a housing having two retainers and one stop extended upward from the upper peripheral edge. A control stem may control the water flowing in and out of the housing. A cap has two orifices for engaging with the retainers and includes a radially extended annular flange having a notch for engaging with the stop and for solidly securing the cap to the housing. A sealing ring is engaged between the cap and the housing for making a water tight seal between the cap and the housing and for preventing water from flowing out of the housing.

1 Claim, 2 Drawing Sheets

VALVE SEALING MECHANISM FOR FAUCET

BACKGROUND OF THE INVENTION

1. Field of the Invention

The present invention relates to a valve, and more particularly to a valve sealing mechanism for a faucet.

2. Description of the Prior Art

Typical faucets comprise a seat and a valve received in the seat for controlling the water outlet. However, typical valves comprise a sealing ring for engaging with the seat only. The valve it self has no sealing ring for preventing water from flowing into the valve itself.

The present invention has arisen to mitigate and/or obviate the afore-described disadvantages of the conventional valves for faucets.

SUMMARY OF THE INVENTION

The primary objective of the present invention is to provide a valve having a sealing ring engaged inside for making a water tight seal within the valve and for preventing water from flowing outward of the valve and into the seat of the faucet.

In accordance with one aspect of the invention, there is provided a valve for a faucet comprising a housing including an inlet and an outlet and including an inner peripheral surface having at least two retainers and at least one stop extended upward from an upper peripheral edge, a stem including a bottom end having a disc, the disc including two curved slots for engaging with the inlet and the outlet of the housing and for controlling water flowing into the housing and flowing outward of the housing, and a cap including an annular flange extended radially outward for engaging with the upper peripheral edge of the housing and including at least two orifices for engaging with the at least two retainers and for securing the cap to the housing, the annular flange of the cap including at least one notch for engaging with the at least one stop and for preventing the cap from rotating relative to the housing and for solidly securing the cap to the housing, the cap including a lower peripheral portion having a sealing ring for engaging with the inner peripheral surface of the housing and for making a water tight seal between the housing and the cap and for preventing water from flowing out of the housing.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
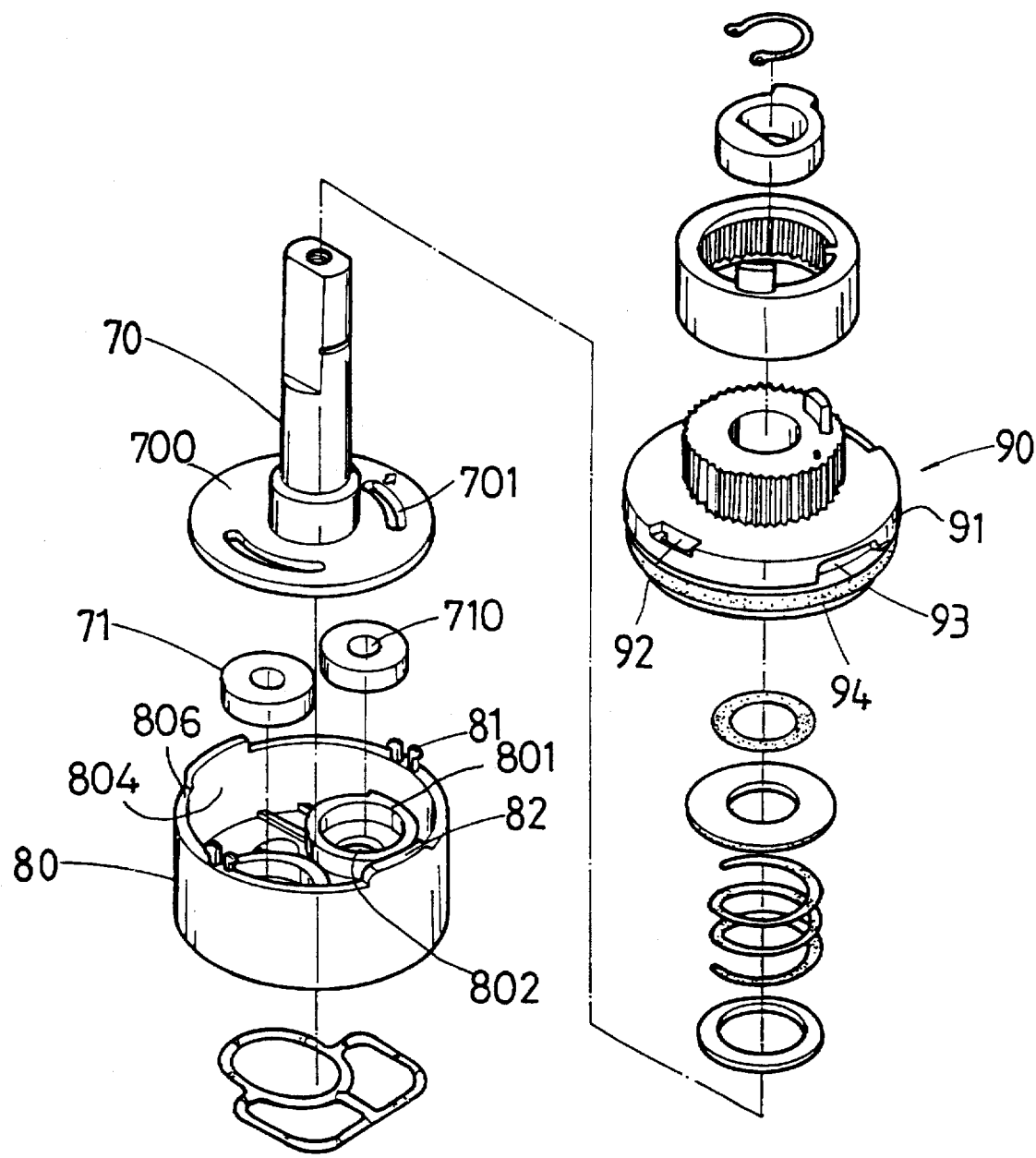
FIG. 1 is an exploded view of a valve.
Figure 2:
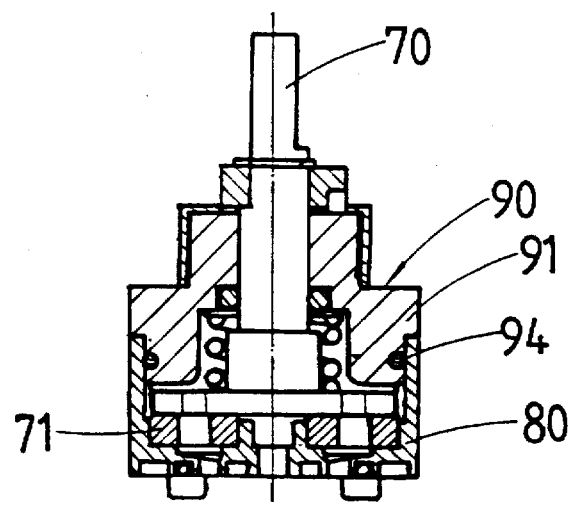
FIGS. 2 and 3 are cross sectional views of the valve, illustrating the application of the valve.

Referring to the drawings, and initially to FIGS. 1 and 2, a valve in accordance with the present invention comprises a housing 80 including two hubs 801 provided on the bottom and around two openings 802 which include an inlet and an outlet. The housing 80 is substantially cylindrical having an inner peripheral surface 804 and having one or more stops 82 and two or more retainers 81 extended upward from the upper peripheral edge 806. Two washers 71 are engaged in the hubs 801 and each has an aperture 710 for aligning with the openings 802. A control stem 70 includes a disc 700 secured to the bottom and rotatably engaged in the housing 80. The disc 700 includes two curved holes 701 for engaging with the openings 802 and for engaging with the apertures 710 of the washers 71 and for controlling the water flowing into housing 80 and flowing outward of the housing 80.

A cap 90 is engaged onto the upper portion of the housing 80 and includes an annular flange 91 extended radially outward for engaging with the upper peripheral edge 806 of the housing 80 and for forming a solidly engaging structure between the housing 80 and the cap 90. The annular flange 91 of the cap 90 includes one or more notches 93 for engaging with the stops 82 and for preventing the cap 90 from rotating relative to the housing 80. The cap 90 includes two or more orifices 92 for engaging with the retainers 81 and for solidly securing the cap 90 to the housing 80. The cap 90 includes a sealing ring 94 engaged on the outer peripheral portion of the lower portion for engaging with the inner peripheral surface 804 of the housing 80 and for making a water tight seal between the housing 80 and the cap 90, such that the water is limited to flow within the housing 80 and is prevented from flowing outward of the housing 80.

Figure 3:
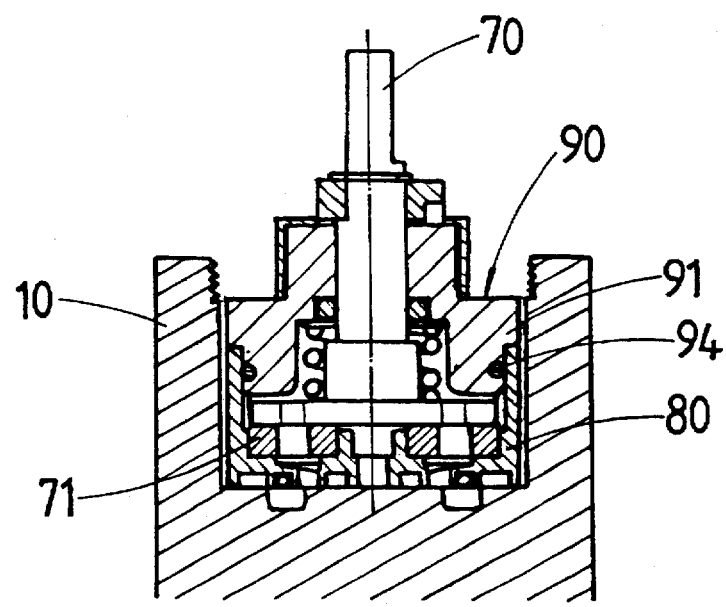

The valve will be disposed in the seat 10 of a faucet (FIG. 3) and will be secured in place by a cover. However, it is to be noted that the sealing ring 94 is engaged between the cap 90 and the housing 80 such that water is prevented from flowing out of the valve and is prevented from flowing into the seat 10.

Accordingly, the valve includes a sealing mechanism having a sealing ring engaged inside the valve for making a water tight seal within the valve and for preventing water from flowing outward of the valve and into the seat of the faucet.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A valve for a faucet comprising:

a housing including a bottom having an inlet and an outlet, said housing being cylindrical and including an inner peripheral surface and including an upper peripheral edge, said housing including at least two retainers and at least one stop extended upward from said upper peripheral edge, a stem including a bottom end having a disc, said disc including two curved slots for engaging with said inlet and said outlet of said housing and for controlling water flowing into said housing and flowing outward of said housing, and a cap including an annular flange extended radially outward for engaging with said upper peripheral edge of said housing and including at least two orifices for engaging with said at least two retainers and for securing said cap to said housing, said annular flange of said cap including at least one notch for engaging with said at least one stop and for preventing said cap from rotating relative to said housing and for solidly securing said cap to said housing, said cap including a lower peripheral portion having a sealing ring for engaging with said inner peripheral surface of said housing and for making a water tight seal between said housing and said cap and for preventing water from flowing out of said housing.

* * * * *